(12) United States Patent
Han

(10) Patent No.: US 6,630,530 B1
(45) Date of Patent: Oct. 7, 2003

(54) METHOD AND COMPOSITION OF A HYDROPHILIC POLYMER DISPERSION CONTAINING A COLLOIDAL SILICA TO BE USED FOR THE RETENTION AIDS OF FINE PARTICLES IN PAPERMAKING SYSTEM

(75) Inventor: Sung Wook Han, Kyungsan (KR)

(73) Assignee: Green Technology Inc., Kyunggi-do (KR)

( * ) Notice: Subject to any disclaimer, the term of this patent is extended or adjusted under 35 U.S.C. 154(b) by 0 days.

(21) Appl. No.: 09/762,764

(22) PCT Filed: Aug. 19, 1999

(86) PCT No.: PCT/KR99/00463
§ 371 (c)(1),
(2), (4) Date: Feb. 13, 2001

(87) PCT Pub. No.: WO00/11053
PCT Pub. Date: Mar. 2, 2000

(51) Int. Cl.[7] .................. C08F 220/56; C08F 220/34; C08F 220/60; C08K 3/36
(52) U.S. Cl. .................. 524/442; 524/458; 524/555
(58) Field of Search ................... 524/458, 442, 524/555

(56) References Cited

U.S. PATENT DOCUMENTS

| 4,929,655 | A |   | 5/1990  | Takeda et al. |
| 5,006,590 | A |   | 4/1991  | Takeda et al. |
| 5,587,415 | A |   | 12/1996 | Takeda |
| 5,597,859 | A | * | 1/1997  | Hurlock et al. ............. 524/458 |
| 5,938,937 | A |   | 8/1999  | Sparapany et al. |
| 6,059,930 | A |   | 5/2000  | Wong Shing et al. |
| 6,238,521 | B1|   | 5/2001  | Shing et al. |

FOREIGN PATENT DOCUMENTS

| EP | 0 525 751 A1 |   | 2/1993 | |
| EP | 630909 A1 |   | 12/1994 | |
| EP | 657478 A2 | * | 6/1995 | ......... C08F/220/56 |
| EP | 0 805 234 A2 |   | 11/1997 | |
| EP | 0 839 767 A2 |   | 5/1998 | |
| WO | WO 97/34933 |   | 9/1997 | |

\* cited by examiner

*Primary Examiner*—Kelechi Egwim
(74) *Attorney, Agent, or Firm*—Birch, Stewart, Kolasch & Birch, LLP

(57) ABSTRACT

The present invention relates to the method and composition of a hydrophilic polymer dispersion containing a colloidal silica to be used for the retention aids of fine particles in papermaking system. More particularly, it relates to the method and composition of a hydrophilic polymer dispersion containing a colloidal silica, which can be used for recycling resources and reducing pollution of the waste water by retaining fine particles in papermaking system.

7 Claims, No Drawings

METHOD AND COMPOSITION OF A HYDROPHILIC POLYMER DISPERSION CONTAINING A COLLOIDAL SILICA TO BE USED FOR THE RETENTION AIDS OF FINE PARTICLES IN PAPERMAKING SYSTEM

TECHNICAL FIELD

The present invention relates to the method and composition of a hydrophilic polymer dispersion containing a colloidal silica to be used for the retention aids of fine particles in papermaking system. More particularly, it relates to the method and composition of a hydrophilic polymer dispersion containing a colloidal silica, which can be used for recycling resources and reducing pollution of the waste water by retaining fine particles in papermaking system.

BACKGROUND ART

In the paper industry, the energy expense reaches 10~15% of cost. The large quantity of waste water occurs due to the use of much water in production. Especially, the accumulation of anionic trash in the system induces the declination of retention of fine particles. Therefore, in case that raw material including a lot of fillers contaminates the waste water, the cost for treatment may increase.

Not a few retention aids have been developed, but they have to be applied to the paper having high quality, and they occur much waste water. Further, more than two materials of retention aids have to be used, because more than two points have to be input respectively. Hence, it has a lot of drawbacks of: i) difficulty of controlling process, ii) low stability of operation, and iii) production of the paper having low quality.

For example, there are many kinds of retention aids based upon various materials, such as, polyacrylamide, polyamine, polyamidoamine, polyethyleneimine and polyethyleneoxide. Among them, the polyacrylamide derivative used for retention aid or paper strength agent can be prepared by the polymerization reaction of dimethylamine, formaldehyde and homopolymer of acrylamide.

The efficiency of polyacrylamide is improved in addition to the particle, such as, bentonite and colloidal silica. Further, in the cationic polymer dispersion, the content of cationic monomer is preferably 10~20 mole % due to the low cationicity. Therefore, the flock having large size and low density is obtained by bridging flocculation, and the paper having low quality is obtained. The excess input of retention aids induces the reduction of fiber formation on the paper. In case that the anionic trash is accumulated in the system, the flocculation is reduced.

Allied Colloids Co., Ltd. provides the 'Hydrocol' system as a retaining method, which has to inject each cationic polymer and each bentonite respectively. Therefore, it has a lot of drawbacks of: i) limited range of application, ii) limited effect to specific paper due to its high cationicity, and iii) large selectivity of effect. Further, it can be used by following steps of: i) forming the flocculation by adding cationic polymer to pulp slurry, ii) destroying the flocculation by applying strong shear force, and ii) inducing the reflocculation by adding bentonite to said flocculation.

Akzo Nobel Co., Ltd. provides the 'Compozil' system using cationic starch and colloidal silica, and the 'Compozil-P' system using cationic polymer and colloidal silica. In case that the cationic starch in this product is flowed out of the system of 'Compozil', it has a lot of drawbacks of: i) increasing the pollution load of the waste water, and ii) increasing the cost for the retention. In the system of 'Compozil-P', a diameter of said colloidal silica has to be less than 10 nm, and the solid content of said colloidal silica has to be less than 10%. Hence, a large amount of transport cost is required. Further, the colloidal silica structured by linear branch of globular silica is unstable, and colloidal silica having less than 3% of solid content has to be provided.

Meanwhile, all developed retention aids can be classified into the following groups of: i) retention aid comprising poly-diallyldimethylammoniumchloride or copolymer of acrylamide and diallyldimethylammoniumchloride; ii) microparticle system comprising organic coagulant and cationic polyacrylamide; iii) microparticle system comprising organic coagulant and anionic polyacrylamide; iv) retention system comprising starch and cationic polymer; and v) retention aid comprising solubilized polymer. However, it has a lot of problems of: i) maintaining the retention of raw material, and ii) inducing the pollution. Further, the retention aid influences the quality of paper, for example, strength and degree of whiteness.

The aqueous dispersions of water-soluble nonionic and anionically charged vinyl and allyl addition polymers were disclosed in WO 97/34933. Also, they can be obtained by polymerizing in the presence of an anionically charged water-soluble polymer stabilizer in a saturated salt solution.

Further, the polymerization process of preparing a water-soluble polymer in the form of a water-continuous dispersion was described in European Pat. 0 630,909 A1. In this process, the peak in-production viscosity developed in the aqueous reaction mixture is lower than the peak in-production viscosity developed in an equivalent batch polymerization.

For forming dialkylaminoalkyl (meth)acrylamide polymer dispersions, a novel dispersant system was disclosed in U.S. Pat. No. 5,597,859. Further, European Pat. 0 839,767 A2 suggested a method for clarifying ink-laden water obtained from the recycling of paper stocks by treating said water with a conventional coagulant followed by treatment with a hydrophilic dispersion polymer. In this method, the hydrophilic dispersion flocculant is a copolymer of DMAE-A.MCQ [dimethylaminoethyl (meth)acrylate methyl chloride quaternary] and (meth)acrylamide.

The improved process for the preparation of water soluble polymer dispersion was disclosed in European Pat. 0 657, 478 A2.

However, none of prior references discloses the far enhanced retention property of fine particles compared to formerly developed hydrophilic polymer dispersion

DISCLOSURE OF INVENTION

The present invention relates to a hydrophilic polymer dispersion composition containing a colloidal silica and a method for preparing such composition which comprises the following steps of: i) mixing acrylamide, cationic monomer, anionic monomer, polymer of cationic monomer, anionic salt and colloidal silica, ii) 1st-polymerizing the mixture obtained in previous step, iii) 2nd-polymerizing the 1st-polymerized mixture containing unreacted monomers completely, and iv) adding and mixing anionic salt to obtained polymers.

Further, the hydrophilic polymer dispersion containing a colloidal silica of the present invention is prepared by following steps of:

i) mixing 1.0~25 wt % of acrylamide, 0~2 wt % of anionic monomer selected from the group consisting of acrylic acid, methacrylic acid and itaconic acid, 1.0~30 wt % of cationic monomer mixture of compound of formula I and formula II, 0.5~5 wt % of polymer selected from the group consisting of homopolymer of compound of formula I, homopolymer of compound of formula II and copolymer of compound of formula I and formula II, 10~30 wt % of anionic salt, 0.5~10 wt % of colloidal silica, 0.01~1 wt % of nonionic surfactant, 0.05~2 wt % of dispersion stabilizer and 40~75 wt % of water ii) 1st-polymerizing the mixture in addition to 0.001~0.1 wt % of polymerization initiator to said mixture;

iii) 2nd-polymerizing the 1st-polymerized mixture containing unreacted monomers completely; and iv) adding and mixing 10~30 wt % of anionic salt to obtained polymers.

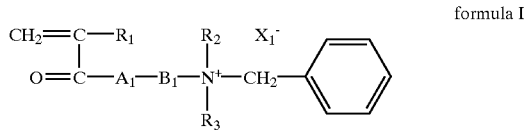

formula I wherein $R_1$ is hydrogen atom or methyl;

$R_2$ and $R_3$ are each independently alkyl group having 1 to 3 carbon atoms;

$A_1$ is oxygen atom or NH;

$B_1$ is alkylene group having 2 to 4 carbon atoms or hydropropylene; and $X_1$ is anionic counter ion.

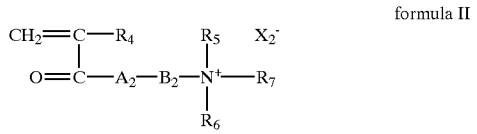

formula II wherein $R_4$ is hydrogen atom or methyl;

$R_5$ and $R_6$ are each independently alkyl group having 1 to 2 carbon atoms;

$R_7$ is hydrogen atom or alkyl group having 1 to 2 carbon atoms;

$A_2$ is oxygen atom or NH;

$B_2$ is alkylene group having 2 to 4 carbon atoms or hydropropylene; and $X_2$ is anionic counter ion.

BEST MODE FOR CARRYING OUT THE INVENTION

The conventional retention aid contains anionic polymer, acrylamide or nonionic polymer, such as, starch, whereas the retention aid of the present invention further contains colloidal silica. Further, the present invention enhances the degree of polymerization of the polymer dispersion by adding and mixing nonionic surfactant to the mixture of cation monomers.

Acrylamide or methacrylamide can be used as nonionic monomer, and acrylic acid, methacrylic acid or itaconic acid can be used as anionic monomer.

The cationic monomer of formula I and cationic monomer of formula II can be mixed in a ratio of 10:0 to 2:8.

The reacting materials for the polymer are a cationic monomer of formula I, cationic monomer of formula II, and homopolymer of cationic monomer of formula I, homopolymer of cationic monomer of formula II, or copolymer of cationic monomer of formula I and formula II as polymer in the present invention.

Said monomer is soluble in initial salt solution, but polymer material is insoluble in initial salt solution. Therefore, the anionic salt has the function for preparing dispersion by dispersing polymer materials to small particles. Said anionic salt is selected from the group consisting of ammonium sulfate, ammonium chloride, sodium sulfate, magnesium sulfate, aluminium sulfate, ammonium hydrogenphosphate, sodium hydrogenphosphate, and potassium hydrogenphosphate. Further, half or more of said anionic salt can be added before polymerization reaction, and the remaining said anionic salt has to be added after polymerization reaction. It is proved as the desirable preparation method for the stable polymer dispersion experimentally.

The colloidal silica firstly introduced in the present invention has the functions of improving the retention. The commercially marketed colloidal silica is classified into cationic colloidal silica, anionic colloidal silica and nonionic colloidal silica. Especially, the colloidal silica having 10~30 nm of diameter can be used in the present invention. It is proved as the desirable diameter for the stable polymer dispersion experimentally.

Said polymer material and colloidal silica can be stabilized by stabilizer, such as, nonionic surfactant and glycerin. The particles of dispersed polymer material is stabilized by following mechanisms of: i) steric hindrance of said nonionic surfactant and ii) repulsion caused by high charge of the polymer material. In case that the content of nonionic surfactant is less than 0.01 wt %, stability of dispersion obtained is lowered. Further, in case that the content of nonionic surfactant is more than 1 wt %, wasted surfactant remains. Also, 0~2 wt % of glycerin can be used as subsidiary dispersant. In case that the content of glycerin is more than 2 wt %, glycerin is wasted. Further, the nonionic surfactant of the present invention activates the nuclei formation, which results in the reduction of in-production viscosity and the stabilization of polymer particles caused by the steric hindrance of the surfactant. Therefore, the nonionic surfactant has a role to enhance the mobility of the final product. Further, the chelating agent, such as, ethylenediaminetetraacetate can be added for the formation of complex. The polymer dispersion is stabilized by forming complex.

The azobis initiator, which is a kind of radical initiator, can be used for polymerizing said cationic monomer of formula I and formula II and said anionic monomer. Azobis isonitrile, for example, commercially marketed V-50 can be used as azobis initiator. 0.001~0.1 wt % of said polymerization initiator can be used. In case that the content of initiator is less than 0.001 wt %, there are some drawbacks of: i) not maintaining polymerization reaction and ii) obtaining insoluble polymer material having high degree of polymerization. On the other hand, in case that the content of initiator is more than 0.1 wt %, there are some drawbacks of: i) increasing and generating the heat during the polymerization, ii) decreasing the yield of polymer material, and iii) preparing polymer material having low degree of polymerization Further, the hydrophilic polymer dispersion containing a colloidal silica of the present invention is prepared by following steps of:

[mixing step] i) mixing 1.0~25 wt % of acrylamide, 0~2 wt % of anionic. monomer, 1.0~30 wt % of cationic monomer mixture of compound of formula I and formula II, 0.5~5 wt % of polymer selected from the group consisting of homopolymer of compound of formula I, homopolymer of compound of formula II and copolymer of compound of formula I and formula II, 10~30 wt % of anionic salt, 0.5~10 wt % of colloidal silica, 0.01~1 wt % of nonionic surfactant, 0.05~2 wt % of dispersion stabilizer and 40~75 wt % of water in the reactor, ii) nitrogen purging in the reactor, and agitating said mixture more than 30 rpm;

[initiator adding step] i) heating said mixture at 20~50° C., ii) adding 0.001~0.1 wt % of initiator to said mixture;

[1st-polymerizing step] 1st-polymerizing said mixture at 20~50° C. for 3~6 hours;

[2nd-polymerizing step] 2nd-polymerizing the 1st-polymerized mixture containing unreacted monomers completely by adding 0.001~0.1 wt % of initiator to said mixture for 3~15 hours;

[finishing step] i) adding the remaining anionic salt to the polymer, ii) adjusting pH of the polymer less than 4.0, iii) sieving the polymer using 40~100 mesh.

In the mixing step, the inside of a reactor is purged with nitrogen, and the raw materials are mixed and agitated homogeneously. Particularly, a part of anionic salt is added in this step, and the remaining part of anionic salt is added after the polymerization. This mixing step is important for raising stability of the dispersion.

In the initiator adding step, the initiator, for example, azobis initiator, such as, azobis isonitrile or redox initiator, such as, ammonium persulfate and sodium bisulfite is added for polymerizing anionic monomer, cationic monomer of formula I and II. Said mixture has to be heated at 20~50° C. where the polymerization is initiated. Further, in the 1st-polymerizing step, the reactor has to be cooled to achieve the maintenance of temperature at 20~50° C. This step has to be maintained for 3~6 hours until polymerization is finished.

In the 2nd-polymerizing step, unreacted monomers in 1st-polymerizing step is completely reacted to form the polymer in addition to said initiator at 20~50° C. for 3~15 hours. Therefore, the polymer dispersion is obtained.

The final product is obtained by the finishing step. In case that the pH of polymer dispersion is more than 4.0, the stability of dispersion is lowered and the efficiency of dispersion is declined.

The final product of the present invention shows the enhanced retention property compared to the commercially marketed products, for example, 'Hydrocol System' by Allied Colloids Co. and 'Compozil System' by Akzo Nobel Co.,. Especially, the properties, e.g. whiteness, surface strength of paper have been excellently increased.

The present invention can be more specifically explained by the following examples. However, it should be understood that the examples are intended to illustrate, but not to limit the scope of the present invention in any manner.

EXAMPLE 1

Preparation of the Polymer Dispersion

The polymer dispersion is prepared by following steps of: i) mixing 211.015 g of 50% acrylamide aqueous solution, 55.616 g of dimethylaminoethyl acrylate benzyl chloride quaternary monomer (80%), 7.5 g of dimethylaminoethyl acrylate methyl chloride quaternary, monomer (20%), 1.875 g of dimethyldiallyl ammonium chloride polymer (40%), 164.943 g of ammonium sulfate, 0.75 g of aromatic ethoxylate, 4.5 g of glycerin, 2.5 g of anionic colloidal silica (30%) and 464.244 g of water in the 5-neck flask, ii) nitrogen purging in the reactor, and agitating said mixture to 200 rpm, iii) heating said mixture at 35° C., iv) adding 0.03 g of azobis isonitrile initiator (VA-044) to said mixture, v) 1st-polymerizing said mixture at 35° C. for 3~6 hours, vi) 2nd-polymerizing the 1st-polymerized mixture containing unreacted monomers completely by adding 0.03 g of said initiator (VA-044) to said mixture for 3~15 hours, vii) adding 64.557 g of sodium sulfate to the polymer, viii) adjusting pH of the polymer less than 4.0, ix) sieving the polymer using 60 mesh.

EXAMPLE 2

Preparation of the Polymer Dispersion

The polymer dispersion is prepared by following steps of: i) mixing 83,004 g of 50% acrylamide aqueous solution, 172.279 g of dimethylaminoethyl acrylate benzyl chloride quaternary monomer (80%), 88.343 g of dimethylaminoethyl acrylate methyl chloride quaternary monomer (80%), 12.5 g of dimethylaminoethyl acrylate methyl chloride quaternary polymer (20%), 3.125 g of dimethyldiallyl ammonium chloride polymer (40%), 140.625 g of ammonium sulfate, 1.25 g of aromatic ethoxylate, 62.5 g of cationic colloidal silica (20%) and 389.499 g of water in the 5-neck flask, ii) nitrogen purging in the reactor, and agitating said mixture to 200 rpm, iii) heating said mixture at 37° C., iv) adding 0.05 g of azobis isonitrile initiator (VA-044) to said mixture, v) 1st-polymerizing said mixture at 37° C for 3~6 hours, vi) 2nd-polymerizing the 1st-polymerized mixture containing unreacted monomers completely by adding 0.05 g of said initiator (VA-044) to said mixture for 3~15 hours, vii) adding 46.875 g of ammonium chloride to the polymer, viii) adjusting pH of the polymer less than 4.0, ix) sieving the polymer using 60 mesh.

EXAMPLE 3

Preparation of the Polymer Dispersion

The polymer dispersion is prepared by following steps of: i) mixing 349.833 g of 50% acrylamide aqueous solution, 31.355 g of dimethylaminoethyl acrylate methyl chloride quaternary monomer (80%), 8.0 g of dimethylaminoethyl acrylate methyl chloride quaternary polymer (20%), 2.0 g of dimethyldiallyl ammonium chloride polymer (40%), 150.591 g of ammonium sulfate, 0.8 g of aromatic ethoxylate, 33.333 g of functional colloidal silica (30%), 6.0 g of glycerin, 0.3 g of ethylenediaminetetraacetate (EDTA) and 352.379 g of water in the 5-neck flask, ii) nitrogen purging in the reactor, and agitating said mixture to 200 rpm, iii) heating said mixture at 35° C., iv) adding 0.05 g of azobis isonitrile initiator (VA044) to said mixture, v) 1st-polymerizing said mixture at 35° C. for 3~6 hours, vi) 2nd-polymerizing the 1st-polymerized mixture containing unreacted monomers completely by adding 0.05 g of said initiator (VA-044) to said mixture for 3~15 hours, vii) adding 65.409 g of ammonium sulfate to the polymer, viii) adjusting pH of the polymer less than 4.0, ix) sieving the polymer using 60 mesh.

EXAMPLE 4

Test of Retention Effect

The printing and liner paper is prepared by using following pulps of: i) pulp containing 400 ppm of polymer dispersion of example 1, ii) pulp containing 400 ppm of polymer dispersion of example 2, iii) pulp containing 400 ppm of polymer dispersion of example 3, iv) pulp not containing retention aid (A), v) pulp containing commercially marketed cationic polymer among retention aid (B), vi) pulp containing cationic polymer and bentonite in a ratio of 100: 1.0 (C), and vii) pulp containing cationic polymer and bentonite in a ratio of 100:3.0 (D). The result is shown in Table 1 and 2.

TABLE 1

|           | OPR (%) | FINE OPR (%) | Quality of paper |
|-----------|---------|--------------|------------------|
| Example 1 | 92.0    | 80.0         | good             |
| Example 2 | 91.0    | 78.0         | good             |
| Example 3 | 89.5    | 75.0         | good             |
| A         | 68.2    | 13.1         | bad              |
| B         | 75.5    | 45.8         | bad              |
| C         | 83.3    | 65.0         | bad              |
| D         | 87.3    | 73.5         | bad              |

OPR : one pass retention
FINE OPR : one pass retention of ash
Experimental condition:
i) Paper : printing paper (70 g/m$^2$)
ii) Concentration of pulp : 0.315%
iii) pH of pulp : 6.80
iv) Instrument : Britt jar

TABLE 2

|           | OPR (%) | Quality of paper |
|-----------|---------|------------------|
| Example 1 | 91.8    | good             |
| Example 2 | 90.6    | good             |
| Example 3 | 89.4    | good             |
| A         | 72.2    | bad              |
| B         | 80.8    | bad              |
| C         | 83.2    | bad              |
| D         | 85.5    | bad              |

OPR : one pass retention
Experimental condition:
i) Paper : liner paper (190 g/m$^2$)
ii) Concentration of pulp : 0.510%
iii) pH of pulp : 6.10
iv) Instrument : Britt jar

What is claimed is:

1. A hydrophilic polymer dispersion containing a colloidal silica prepared by following steps of:
   i) mixing 1.0~25 wt % of acrylamide, 0~2 wt % of anionic monomer selected from the group consisting of acrylic acid, methacrylic acid and itaconic acid, 1.0~30 wt % of cationic monomer mixture of compound of formula I and formula II, 0.5~5 wt % of polymer selected from the group consisting of homopolymer of compound of formula I, homopolymer of compound of formula II and copolymer of compound of formula I and formula II, 10~30 wt % of anionic salt, 0.5~10 wt % of colloidal silica, 0.01~1 wt % of nonionic surfactant, 0.05~2 wt % of dispersion stabilizer other than the nonionic surfactant, and 40~75 wt % of water;
   ii) 1$^{st}$-polymerizing the mixture with the addition of 0.001~0.1 wt % of polymerization initiator to said mixture;
   iii) 2$^{nd}$ polymerizing unreacted monomers in the 1$^{st}$-polymerized mixture; and
   iv) adding and mixing 10~30 wt % of anionic salt to obtained polymers

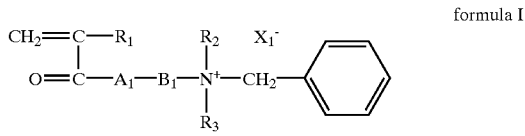

formula I wherein
$R_1$ is hydrogen atom or methyl;
$R_2$ and $R_3$ are each independently alkyl group having 1 to 3 carbon atoms;
$A_1$ is oxygen atom or NH;
$B_1$ is alkylene group having 2 to 4 carbon atoms or hydropropylene; and
$X_1$ is anionic counter ion

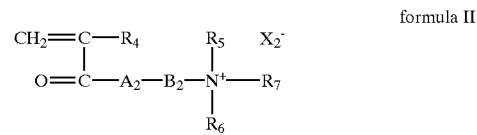

formula II wherein
$R_4$ is hydrogen atom or methyl;
$R_5$ and $R_6$ are each independently alkyl group having 1 to 2 carbon atoms;
$R_7$ is hydrogen atom or alkyl group having 1 to 2 carbon atoms;
A is oxygen atom or NH;
$B_2$ is alkylene group having 2 to 4 carbon atoms or hydropropylene; and
$X_2$ is anionic counter ion.

2. The hydrophilic polymer dispersion according to claim 1, wherein said colloidal silica has 10~30 nm of diameter.

3. The hydrophilic polymer dispersion according to claim 1, wherein said anionic salt is selected from the group consisting of ammonium sulfate, ammonium chloride, sodium sulfate, magnesium sulfate, aluminium sulfate, ammonium hydrogenphosphate, sodium hydrogenphosphate, and potassium hydrogenphosphate.

4. The hydrophilic polymer dispersion according to claim 1, wherein said dispersion stabilizer is selected from the group consisting of nonionic surfactant and glycerin.

5. The hydrophilic polymer dispersion according to claim 1, wherein the ratio of the cationic monomer of formula I and formula II is in the range of 10:0 to 2:8.

6. A process for preparing hydrophilic polymer dispersion containing a colloidal silica comprising the steps of:
   i) mixing 1.0~25 wt % of acrylamide, 0~2 wt % of anionic monomer selected from the group consisting of acrylic acid, methacrylic acid and itaconic acid, 1.0~30 wt % of cationic monomer mixture of compound of formula I and formula II, 0.5~5 wt % of polymer selected from the group consisting of homopolymer of compound of formula I, homopolymer of compound of formula II and copolymer of compound of formula I and formula II, 10~30 wt % of anionic salt, 0.5~10 wt % of colloidal silica, 0.01~1 wt % of nonionic surfactant, 0.05~2 wt % of dispersion stabilizer other than the nonionic surfactant, and 40~75 wt % of water;
   ii) 1$^{st}$-polymerizing the mixture with the addition of 0.001~0.1 wt % of polymerization initiator to said mixture;
   iii) 2$^{nd}$-polymerizing unreacted monomers in the 1$^{st}$-polymerized mixture; and iv) adding and mixing 10~30 wt % of anionic salt to obtained polymers

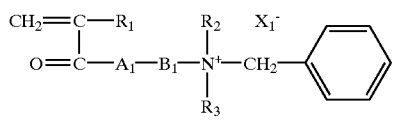

formula I wherein
$R_1$ is hydrogen atom or methyl;
$R_2$ and $R_3$ are each independently alkyl group having 1 to 3 carbon atoms;
$A_1$ is oxygen atom or NH;
$B_1$ is alkylene group having 2 to 4 carbon atoms or hydropropylene; and
$X_1$ is anionic counter ion

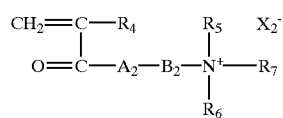

formula II wherein
$R_4$ is hydrogen atom or methyl;
$R_5$ and $R_6$ are each independently alkyl group having 1 to 2 carbon atoms;
$R_7$ is hydrogen atom or alkyl group having 1 to 2 carbon atoms;
$A_2$ is oxygen atom or NH;
$B_2$ is alkylene group having 2 to 4 carbon atoms or hydropropylene; and
$X_2$ is anionic counter ion.

7. The process for preparing hydrophilic polymer dispersion containing a colloidal silica according to claim 6, which comprises the steps of:

i) mixing 1.0~25 wt % of acrylamide, 0~2 wt % of anionic monomer, 1.0~30 wt % of cationic monomer mixture of compound of formula I and formula II, 0.5~5 wt % of polymer selected from the group consisting of homopolymer of compound of formula I, homopolymer of compound of formula II and copolymer of compound of formula I and formula II, 10~30 wt % of anionic salt, 0.5~10 wt % of colloidal silica, 0.01~1 wt % of nonionic surfactant, 0.05~2 wt % of dispersion stabilizer other than the nonionic surfactant, and 40~75 wt % of water in the reactor;

ii) nitrogen purging in the reactor, and agitating said mixture more than 30 rpm;

iii) heating said mixture at 20-50° C.;

iv) adding 0.001~0.1 wt % of initiator to said mixture;

v) $1^{st}$-polymerizing said mixture at 20~50° C. for 3~6 hours;

vi) $2^{nd}$-polymerizing unreacted monomers in the $1^{st}$-polymerized mixture by adding 0.001~0.1 wt % of initiator to said mixture for 3~15 hours;

vii) adding the remaining anionic salt to the polymer;

viii) adjusting pH of the polymer less than 4.0; and ix) sieving the polymer using 40~100 mesh.

* * * * *

UNITED STATES PATENT AND TRADEMARK OFFICE
CERTIFICATE OF CORRECTION

PATENT NO. : 6,630,530 B1  Page 1 of 1
DATED : October 7, 2003
INVENTOR(S) : Sung Wook Han It is certified that error appears in the above-identified patent and that said Letters Patent is hereby corrected as shown below:

Title page,
Item [30], Foreign Application Priority Data, please add -- KR 1998/34277 August 24, 1998 --

Signed and Sealed this

Twenty-ninth Day of June, 2004

JON W. DUDAS
*Acting Director of the United States Patent and Trademark Office*